(12) United States Patent
Shirani (10) Patent No.: US 7,293,057 B2
(45) Date of Patent: Nov. 6, 2007

(54) METHOD AND APPARATUS FOR CANCELLING INTER-SYMBOL INTERFERENCE (ISI) WITHIN A COMMUNICATION CHANNEL

(75) Inventor: Ramin Shirani, Morgan Hill, CA (US)

(73) Assignee: Plexus Networks, Inc., Morgan Hill, CA (US)

( * ) Notice: Subject to any disclaimer, the term of this patent is extended or adjusted under 35 U.S.C. 154(b) by 538 days.

(21) Appl. No.: 10/679,107

(22) Filed: Oct. 2, 2003

(65) Prior Publication Data

US 2004/0193669 A1 Sep. 30, 2004

Related U.S. Application Data

(60) Provisional application No. 60/488,145, filed on Jul. 16, 2003, provisional application No. 60/415,790, filed on Oct. 2, 2002.

(51) Int. Cl.
*G06G 7/02* (2006.01)
(52) U.S. Cl. ...................................... 708/819
(58) Field of Classification Search ................. 708/819
See application file for complete search history.

(56) References Cited

U.S. PATENT DOCUMENTS

| | | | | |
|---|---|---|---|---|
| 2002/0168002 A1* | 11/2002 | Birru | ........................... | 375/233 |
| 2003/0219085 A1* | 11/2003 | Endres et al. | ................ | 375/350 |
| 2003/0223505 A1* | 12/2003 | Verbin et al. | ................ | 375/261 |
| 2004/0008765 A1* | 1/2004 | Chung et al. | ................ | 375/233 |

* cited by examiner

*Primary Examiner*—Tan V. Mai
(74) *Attorney, Agent, or Firm*—Sawyer Law Group LLP (57) ABSTRACT

A decision feedback equalizer finite impulse response (DFE FIR) filter for cancelling inter-symbol interference within a signal transmitted through a communication channel. The DFE FIR filter includes a feed-forward equalization path to receive the signal transmitted through the communication channel and generate a first partially equalized signal from the signal based on a plurality of coefficients associated with the feed-forward equalization path; a feedback equalization path to generate a second partially equalized signal that corrects for the inter-symbol interference within the signal based on an output of the DFE FIR filter; a summer to combine the first partially equalized signal with the second partially equalized signal; and a signal amplifier to receive the combined signal from the summer and generate the output of the DFE FIR filter.

10 Claims, 7 Drawing Sheets

METHOD AND APPARATUS FOR CANCELLING INTER-SYMBOL INTERFERENCE (ISI) WITHIN A COMMUNICATION CHANNEL

CROSS REFERENCE TO RELATED APPLICATIONS

This application claims the benefit of U.S. Provisional Application No. 60/415,790, filed Oct. 2, 2002, and claims the benefit of U.S. Provisional Application No. 60/488,145, filed Jul. 16, 2003.

RELATED APPLICATION

This application is related to U.S. patent application, Ser. No. 10/678,999, entitled "An Adaptive Clock-Less Equalizer Circuit", and filed on the even date herewith.

FIELD OF THE INVENTION

The present invention relates generally to circuits and more particularly to equalization in a low-power high-frequency circuit utilizing a finite impulse response filter.

BACKGROUND OF THE INVENTION

Fully digital receiver equalizers, using finite impulse response (FIR) filters, require high-resolution sampling ADCs that run at GHz speeds, which is a quite challenging task in present CMOS technologies, and conceptually can burn a lot of power. The basic elements of a FIR filter are delay elements, adders, and multipliers to implement the following FIR equation:

$$Veq(n.\ t\ s)=Vi(n.t.s)+\alpha Vi(n-1).t\ s)+\beta Vi(n-2).t\ s)+\ldots$$

The disadvantage with most analog continuous-time equalizers is that they need very wide-bandwidth delay elements that run at the same speed as the input data, and therefore burn considerable power. Input equalizers, reported to date in CMOS technology (toward main stream process and low power), operate at data rates around 1-2 Gbps (1). Therefore, in low-power applications where multi-gigabit/s (2.5→10 Gbps) equalizers are required, speed limitations of the CMOS process make it impractical to implement FIR equalizers in the traditional digital or analog methods.

Accordingly, what is needed is a system and method for providing very low-power equalization for circuits operating on the Gbps range. The equalization should be easy to implement, cost effective and compatible with existing technology. The present invention addresses such a need.

SUMMARY OF THE INVENTION

A finite impulse response (FIR) filter is disclosed. The FIR filter comprises a passive delay line and a plurality of delay stages coupled to the passive delay line. The plurality of delay stages comprise a multiplier stage. The FIR filter includes an amplifier coupled to the delay line.

A FIR filter in accordance with the present invention compensates the low-pass and/or dispersive characteristics of a communication channel (cable, fiber, etc.) in a multi-Gbps link. The receiver uses the filter to cancel the inter-symbol interference (ISI) caused by the channel on the received data.

In a second aspect, a decision feed-back equalizer (DFE) is a non-linear filter that can cancel the non-linear dispersion effects of a channel, and therefore extends its application to a very wide range of communication channels, including but not limited to channels with linear multi-path and/or non-linear distortion effects. Accordingly, broadband techniques to implement these elements at very low-power, while capable of operating at very high speeds, e.g., 10 Gbps and beyond are provided.

DETAILED DESCRIPTION

The present invention relates generally to circuits and more particularly to equalization in a low-power high-frequency circuit utilizing a finite impulse response filter. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
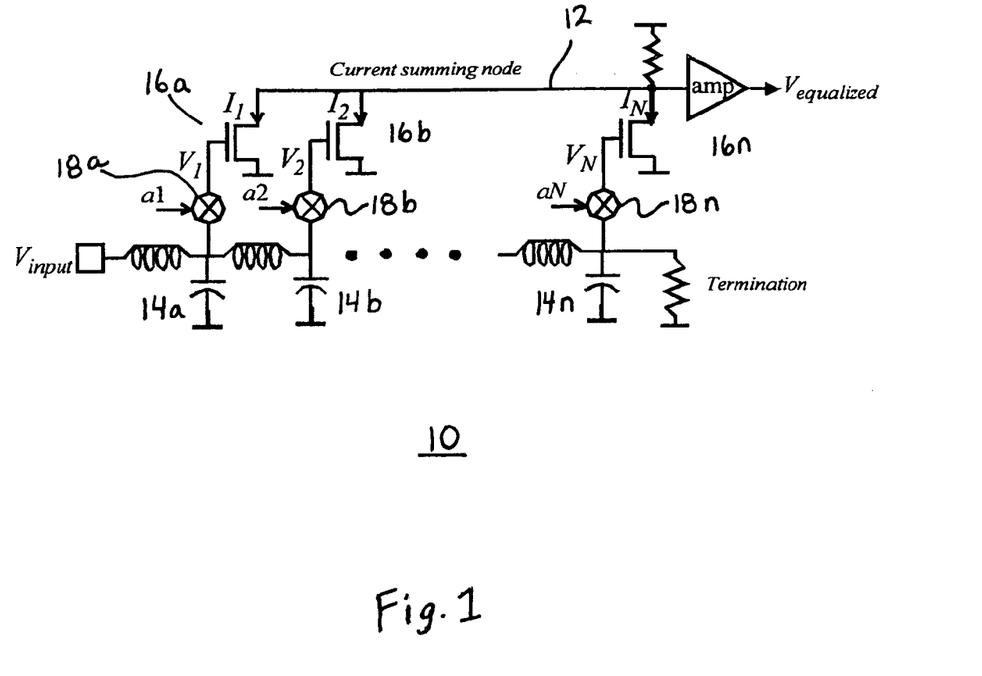
FIG. 1 illustrates a first embodiment of a FIR filter in accordance with the present invention.

FIG. 1 illustrates a first embodiment of a FIR filter 10 in accordance with the present invention. The required delay for FIR filter 10 is created by passing the signal directly through a transmission (delay) line 12 on chip. The significant advantage of the passive delay line 12 is its zero power consumption, while other active forms of delay elements especially at multi-GHz range consume significant power. However, generating reasonable delay times (tens of psec and above) using just plane metal lines requires extremely long lengths, making on-chip implementation impractical. Therefore, lumped LC transmission lines 14a-14n are utilized to achieve the range of delays expected for the FIR filter.

The multiplication stage is performed by passing the output signal from each delay stage through an attenuator that can continuously attenuate the signal from no attenuation ($\alpha i=1$) to complete blocking ($\alpha i=0$). The attenuated signal is then applied to a GM stage/transistor stage 16a-16n that converts the signal voltage into current. Therefore, the output currents of the Gm stages are direct representatives of the delayed version of the signals multiplied by the corresponding filter tap weight ($\alpha i$). The adder circuit is implemented by a current summing element, which is capable of very high-speed analog summing. In this scheme, the output terminals of the Gm stages 16a-16n are connected together to form the signal current addition, and tied to a resistance to implement the current to voltage conversion.

The only power consuming stage in this architecture is the multiplier circuit 18a-18n. The power of the multiplier is defined by the loop-bandwidth of the multiplier stage, which directly depends on the speed of the operation. At 10 Gbps, where the required bandwidth is ~7 GHz, the estimated required power for a differential stage of such multiplier implementation in a 10 stage filter is 50 mW. One other advantage of this multiplier structure is that the power consumption increases slower than a linear function of the number of stages.

The inductors can use mutual-flux coupling to increase the effective inductance per area. The mutual coupling also helps reduce the total inductor size, resulting in less capacitive and resistive parasitics. The inductor resistance can play as a bottleneck for this design if the number of delay stages required is high, since the total series resistance of the inductors in the signal path can attenuate the signal considerably.

Figure 2:
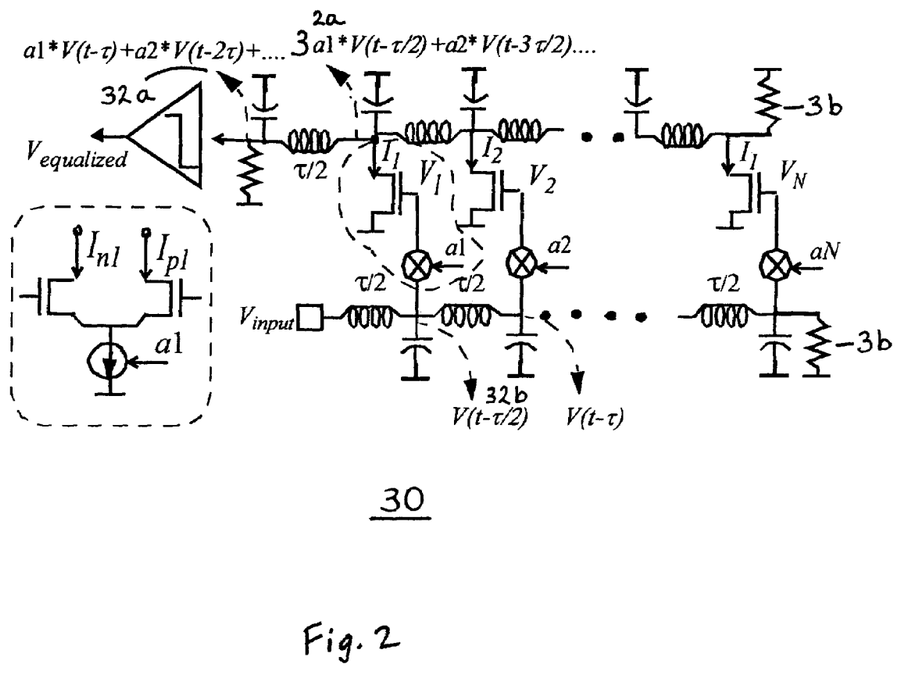
FIG. 2 illustrates a second embodiment of a proposed FIR filter in accordance with the present invention.

FIG. 2 illustrates a second embodiment of a FIR filter 30 in accordance with the present invention. In this design, the effective number of delay stages are broken into two branches 32a and 32b where each branch has half the total delay, and thus signal attenuation in each passive branch before amplification by an active stage is half. As FIG. 2 clearly demonstrates, in this alternative embodiment, the signal moves in two opposite directions, gets half of the required delay through the bottom branch, is multiplied by the tap coefficient, and added to the top branch where it gets the second half of the delay. One advantage of this approach compared to the FIG. 1 FIR filter 10 is the higher power dissipation as the top branch has to have two sides terminated and therefore twice as much power for the same termination resistor 36 value is dissipated. However, by careful design, one can use larger (double) termination resistor for the top branch and adjust the LC delay stages accordingly to re-gain the extra power loss due to two terminations.

Tuning Stage

An accurate delay for the LC stages is a critical factor in determining the quality of the filter equalization. As the values of the inductors and capacitors vary across the process, a LC tuning stage is desirable.

Operation of the Tuning Circuit

Figure 3:
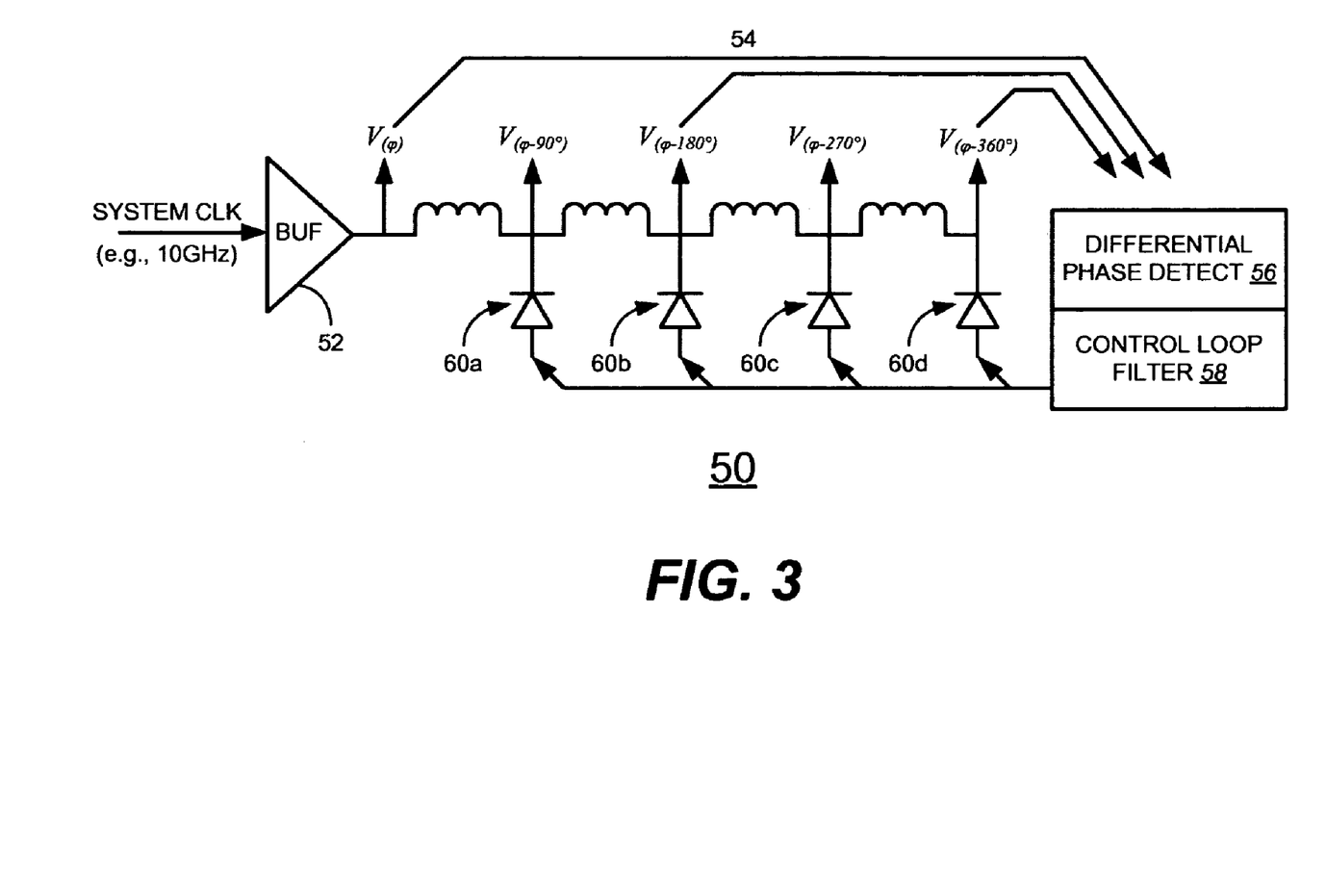
FIG. 3 illustrates on-chip LC tuning using delay line feedback of a FIR filter in accordance with the present invention.

FIG. 3 illustrates on-chip LC tuning circuit 50 using delay line feedback. This LC timing uses an available system clock with a known and accurate frequency (e.g., 10 GHz) and tunes the delay stages to the period of the system clock by adjusting the varactors connected to each LC section.

The tuning circuit 50 comprises an input clock buffer 52, a four stage delay element 54, a differential phase detector 56, and a loop filter 58. A precise system clock is provided to the IC an propagates through four identical inductor/varactor stages. The differential phase detector 56 senses the rising edge of the clock, the rising edge delayed by 180 degrees, and the rising edge delayed by 360 degrees (a complete period). Any delay difference is translated into a current and fed to the loop filter 58. The loop filter 58 converts the cuffent difference into a voltage value. This voltage output is used to tune the delay of the varactor 60a-60d in such a way that all the sensed clock edges (rising edge, 180 delayed, and 360 delayed) line up. This is a second order feedback loop which tunes the delay of the four inductor/varactor stages in such a way that the delay is exactly one clock cycle. Now if exactly identical inductor/varactor stages are physically laid out (nearby within the same wafer) with the same value of the control voltage (on the varactor), their delay characteristic will mimic the delay of the stages within the tuning stage. This is known as slaving the delay of a separate stage by using a feedback tuning circuit. Therefore, by establishing a voltage on the varactor within a tuning feedback circuit, one can construct precise delay elements through constructing identical stages nearby, and use the same control voltage to only tune the varactor.

The main challenge is to implement such a filter in CMOS which is a lower speed process technology compared to its other counterparts, but have several other advantages. So it is first important to ensure the CMOS active stages operate at multi-Gbps rates without degrading the high-speed signal qualities. The current modulating multiplier stage is the only active stage in this design, which is in another clear advantage of this design that requires very few devices to operate at maximum speed.

Figure 4A:
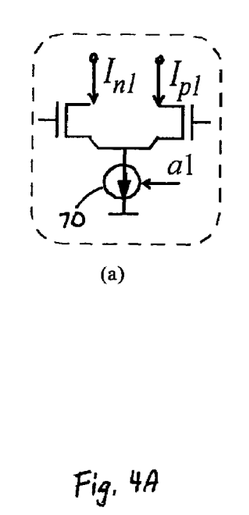
FIGS. 4A-4C illustrate differential multiplier stages in a low-speed process (e.g., CMOS) in accordance with the present invention.
Figure 4B:
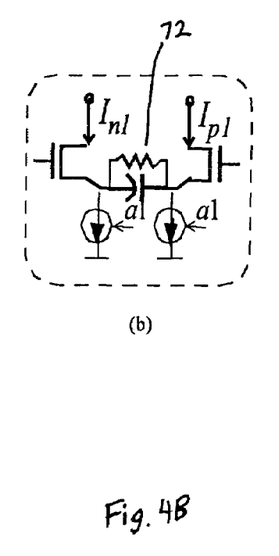
Figure 4C:
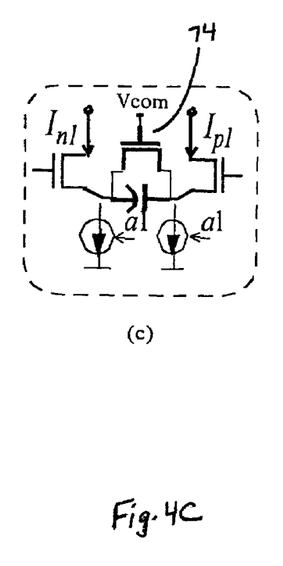

FIGS. 4A, 4B and 4C illustrate three embodiments of differential multiplier stage in a low-speed process (e.g. CMOS). FIG. 4A shows an example of a first embodiment differential multiplier stage. The tail current device 70 is adjustable (probably using an adjustable digital to analog converter current source) to modulate the stage transconductance, and thus its output current as a function of the input voltage. Depending on the application, an automatic gain control amplifier (AGC) can be used to adjust the input signal level to the input dynamic range of the multiplier stages. The input dynamic range of the stages can be improved if emitter degeneration is employed, and a variable emitter degeneration resistor can be employed so the multiplier tracks the device variations over process.

However, the problem with the above multiplier stage in CMOS is its limited operational bandwidth. To address this issue, a RC equalizing network 72 is proposed to be placed at the tail of the multiplier stage, FIG. 4B.

This equalizing stage improves the stage at higher frequencies, which extends the lower frequency small signal dynamic range due to its emitter degeneration effect. As devices in a fabrication process vary significantly from the fast to the slow corner of the process, this equalizing network must be able to track the same process variation. The proposed solution is to replace the resistor with a NMOS device 74 that is biased in its triode region and is biased at the input common-mode voltage, shown in FIG. 4C. The resistance of the NMOS device 74 varies exactly as the transconductance of the input NMOS devices as they have the same exact VGS, gate-source overdrive voltage. As a result, the stage gets more equalization for slower devices (larger effective resistance) and gets less equalization for faster devices (smaller effective resistance).

To ensure this design is robust enough in process technologies such as CMOS with relatively lower gains and higher device and environment noise, it is recommended to use a CMOS low noise amplifier (LNA) at the front-end of the receiver, before the filter stage. The advantage of this FIR filter in accordance with the present invention.

FIR Filter Advantages

1. Performing all the filter function in the analog domain allows the equalizer to operate at multi-Gbps speeds using CMOS technologies at low complexity, and therefore requiring very low power compared to a digital approach requiring very fast ADCs and multi-GHz DSP engine. The proposed analog multiplier and adder enable the FIR filtering at very high speeds and low power.

2. Other continuous-time implementations of FIR filters at multi-GHz use active analog delay stages. Such analog delay stages not only consume considerable power to run at speed, but also there is a direct trade-off between the amount of the delay in each stage and signal quality through the stage. A wideband passive delay stage as proposed does not suffer from such problems.

3. The other method used successfully to combat inter-symbol interference (ISI) so far in multi-Gbps links is transmitter pre-emphasis. However, one drawback of the transmit pre-emphasis is that it consumes part of the transmitter power for pre-shaping the output signal. If channel bandwidth is considerably lower than the data rate, the pre-emphasis may require a large portion of the output driver power budget. While in a receiver equalizer the extra filter taps lead to a small power overhead. In addition, a transmit pre-emphasis approach imposes issues such as interoperability in systems that include far side transmitters that do not use pre-emphasis, or a medium (e.g., fiber) is not a linear channel.

4. From a signal integrity point of view, it is preferred to transmit signals with low-frequency contents or large rise/fall transition times. This is because high-frequency signal components excite the high-frequency modes of the cable or fiber, and thus requiring a better-behaved transmission medium. However, increasing the transition times of the signal reduces the effective data eye opening at the receiver, which can result in higher bit error rates (BER) in the system. Having an equalizer that acts as a high-pass filter, a receiver can sharpen the signal transitions of the received data, which has maximum allowable transition time (minimized high-frequency components), effectively increasing the data eye opening.

Decision Feedback Equalizer (DFE) FIR Filter

A decision feedback equalizer compensates the low-pass and/or dispersive characteristics of a communication channel (cable, fiber, etc.) in a multi-Gbps link. The receiver uses this equalizer to cancel the inter-symbol interference (ISI) caused by the channel on the received data.

A decision feedback equalizer (DFE) is a non-linear filter that can cancel the non-linear dispersion effects of a channel, and therefore extends its application to a very wide range of communication channels, including but not limited to channels with linear multi-path and/or nonlinear distortion effects.

Figure 5:
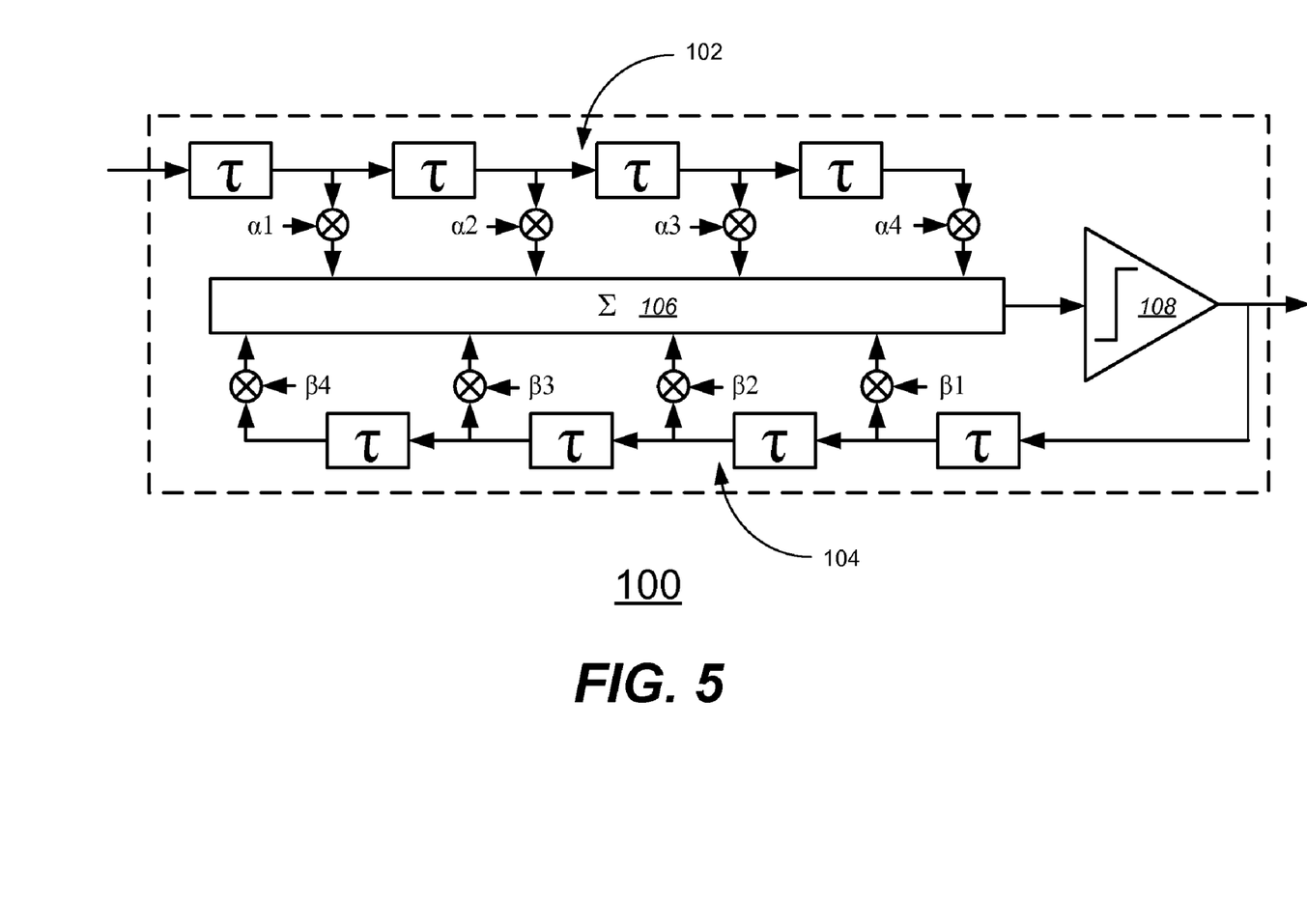
FIG. 5 illustrates an embodiment of a decision feedback equalizer (DFE) filter with the feed forward and feedback equalization path using finite impulse response (FIR) filter of figure.

FIG. 5 illustrates an embodiment of a decision feedback equalizer (DFE) FIR filter with the feed forward and feedback equalization path 102 and 104 respectively, using the finite impulse response (FIR) filter of FIG. 1. A summer 106 receives signals from the paths 102 and 104 and provides a signal amplifier 108 to provide the equalized signal. The FIR filter in the feedback path uses the sampled and digitized values of the received bits to correct for the inter-symbol interference (ISI) caused by those bits on the current data symbol being detected. Performing equalization based on the data bits already detected is a strong technique to cancel the unwanted distortion in the channel caused by "previous data symbol", without acting on the other interference in the channel. This is a key feature of a decision feedback equalizer (DFE) filter that makes it very suitable for linear multi-path channels, as these channels usually have notches in their frequency spectrum, as shown in FIG. 6.

Figure 6:
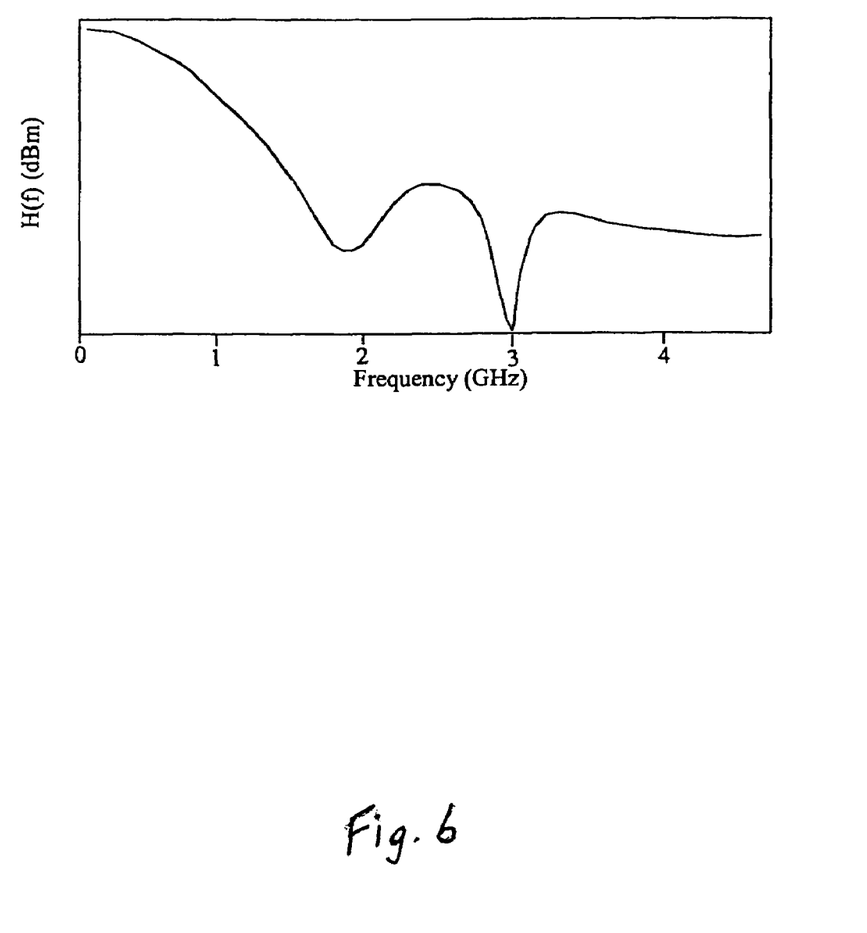
FIG. 6 is of a linear multi-path channel frequency spectrum for a channel.

FIG. 6 is an example of a linear multi-path channel frequency spectrum of a channel. This means that the signal traveling through the above channel is significantly attenuated at the notch frequency. If a linear feed forward FIR filter is used to correct for this channel, it has to amplify the signal at the notch frequency significantly to flatten the channel response. This high filter gain at notch frequency results in large noise amplification at that frequency, thus lower signal quality. But in the case of a decision feedback filter, the correcting FIR filter only uses the previously detected bits and no noise is included in the filter.

However, there are two main issues with a decision feedback only filter, one being a system issue and one an implementation issue. As mentioned earlier, the decision feedback only can act on the previous bits and as a result cannot compensate for the effect of the future data symbols on the current bit being sampled. This type of interference is called pre-cursor inter-symbol interference (ISI). As a result, a feed forward equalizer (FFE) is required to cancel the pre-cursor inter-symbol interference (ISI) in the system.

The second issue with the feedback only equalizer is the limited speed of the decision feedback loop that turns into a serious bottleneck for implementation in relatively slow processes like CMOS at multi-GHz speeds. To be able to fully utilize a decision feedback equalizer (DFE) filter, all the previously detected bits must have been resolved at the time of the detection for a current bit. However, due to the limited speed of the comparator a certain number of bits right after the current bit may not be ready for the use of the feedback filter. Therefore, the feedback equalization (FBE) is delayed for as many bit periods that it takes for a sampled data symbol to be resolved. Using this technique allows the decision feedback equalizer (DFE) filter to perform more effective feedback equalizer (FBE) filtering for part of the inter-symbol interference (ISI) that is a certain number of bit periods away from the main data symbol, and leave the equalization of the inter-symbol interference (ISI) close to the symbol to the feed-forward (FFE) filter. Thus, this technique is a suitable approach for channels with relatively large multi-path delays where signal amplitude is fairly large for several bit periods, such as in long multi-mode fibers.

The decision feedback equalizer (DFE) filter of FIG. 5 can be implemented both in digital or analog fashion. The digital approach requires a very fast ADC with high enough resolution to perform acceptable level of equalization on the data. That means all the delay stages, the multiplier, and the summer have to be so many bits wide and operate at multi-GHz frequency. At the same time, the design of the feedback loop becomes very challenging as in addition to time it takes to resolve the bit, the multiplication and summation fraction must be done digitally in feedback cycle. In the analog approach, however, the multiplication and summation can be all done in one stage (1), thus allowing for more effective decision feedback equalizer (DFE) design. One important observation in the analog design of the decision feedback equalizer (DFE) architecture as shown in FIG. 5 is the feed-forward (FFE) filter analog delay elements. Without accurate analog delay elements, implementation of a complete decision feedback equalizer (DFE) filter with required pre-cursor and post-cursor taps in its feed-forward (FFE) path is not feasible.

Figure 7:
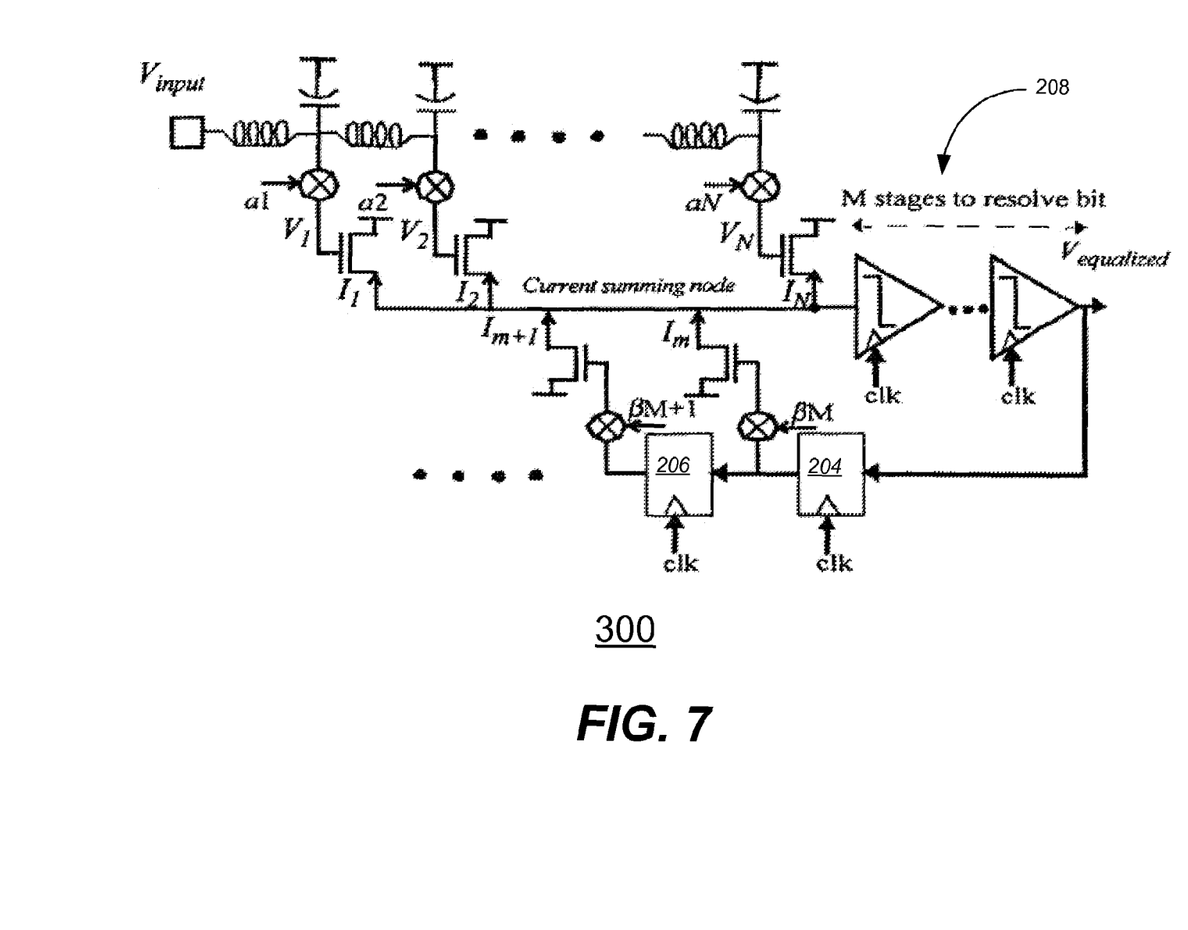
FIG. 7 illustrates an embodiment of the combined microwave-digital decision feedback equalizer (DFE) filter in accordance with the present invention.

FIG. 7 illustrates an embodiment of the combined microwave-digital DFE filter in accordance with the present invention. In this embodiment, the FIR filter 200 of FIG. 1 and microwave delay elements 202 are combined, to provide a feed-forward (FFE) path with a feedback equalizer (FBE) path. The clocked flip-flops 204 and 206 are utilized as delay elements for the already resolved bits.

This filter 300 includes M stages 208 of delay (i.e., M bit times) for the decision on the sampled symbol. There is a direct trade-off between the speed of the decision circuit and number of stages to resolve the bit, M. Clearly one gets reduced M by using a faster process technology and/or burning more power in decision stages. The length of the feed-forward (FFE) filter must be equal to the length of the longest pre-cursor inter-symbol interference (ISI) plus M bit times, so that it can cancel the whole portion of inter-symbol interference (ISI) that cannot be cancelled by feedback equalization (FBE) section of decision feedback equalizer (DFE). It must be noted that without the deployment of accurate analog delay elements (in this disclosure microwave LC elements), the implementation of such a decision feedback equalizer (DFE) architecture is not feasible. In addition to the system advantages of a decision feedback equalizer (DFE) that limits noise amplification, this architecture minimizes the number of the large LC delay elements used by replacing them with a significantly smaller flip-flop for the portion of the inter-symbol interference (ISI) cancellation that feedback equalization is possible, i.e., M bit times after symbol detection. Again, this proves quite helpful for the channels with extended inter-symbol interference (ISI) in time. The advantages of the combined microwave-digital decision feedback equalizer (DFE) filter are described herein below.

Combined Microwave-Digital (DFE) Filter Advantages

1. Performing the filter function in the analog domain allows the equalizer to operate at multi-Gbps speeds using CMOS technologies at low complexity, and therefore requiring very low power compared to a digital approach requiring very fast ADCs and multi-GHz DSP engine.

2. The performance of this filter is between a straight feed-forward (FFE) filter and an idea decision feedback equalizer (DFE) filter with no delay in its feedback path. Compared to a feed-forward (FFE) only filter, this filter is superior in a way that it uses decision feedback filtering on portion of the symbol and thus does not improve noise for certain parts of channel frequency spectrum.

3. Use of feedback equalizer (FBE) path allows for reduction of feed-forward (FFE) filter length for the portion of the inter-symbol interference (ISI) that happens certain bit times away from the main symbol. Considering that analog delay stages are typically either very large or very power hungry, this approach can reduce circuit size, power, or both in cases that very long filters are required.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A decision feedback equalizer finite impulse response (DFE FIR) filter for cancelling inter-symbol interference within a signal transmitted through a communication channel, DFE FIR filter comprising:
   a feed-forward equalization path to receive the signal transmitted through the communication channel and generate a first partially equalized signal from the signal based on a plurality of coefficients associated with the feed-forward equalization path;
   a feedback equalization path to generate a second partially equalized signal that corrects for the inter-symbol interference within the signal based on an output of the DFE FIR filter;
   a summer coupled to both the feedback equalization path and the feed-forward equalization path, the summer to combine the first partially equalized signal from the feed-forward equalization path with the second partially equalized signal from the feedback equalization path; and
   a signal amplifier to receive the combined signal from the summer and generate the output of the DFE FIR filter.

2. The DFE FIR filter of claim 1, wherein the feed-forward equalization path comprises:
   a first passive delay line that has zero power consumption;
   a first plurality of delay stages coupled to the first passive delay line, each delay stage of the first plurality of delay stages delaying the signal by a fraction of a bit time and multiplying the signal by a given coefficient associated with the feed-forward equalization path; and
   a first amplifier coupled to the first passive delay line.

3. The DFE FIR filter of claim 2, wherein each delay stage of the first plurality of delay stages includes:
   an attenuator,
   an L-C transmission line coupled to the attenuator, and
   a transistor stage coupled to the attenuator.

4. The DFE FIR filter of claim 3, wherein an L-C tuning arrangement is utilized to tune the first plurality of delay stages.

5. The DFE FIR filter of claim 2, wherein:
   the first plurality of delay stages comprise a differential multiplier stage.

6. The DFE FIR filter of claim 5, wherein the differential multiplier stage includes a tail current device.

7. The DFE FIR filter of claim 5, wherein the differential multiplier stage includes an RC equalizing network.

8. The DFE FIR filter of claim 5, wherein the differential multiplier stage includes a NMOS device.

9. The DFE FIR filter of claim 1, wherein the communication channel comprises one of a cable or a fiber in a multi-Gbps link.

10. The DFE FIR filter of claim 9, wherein the feed-forward equalization path generates the first partially equalized signal by cancelling pre-cursor inter-symbol interference from the signal transmitted through the communication channel.

* * * * *